Jan. 29, 1952     A. H. DAVIS     2,583,685
REVERSIBLE MOTOR CONTROLLED PORTABLE IRONER
Filed Aug. 6, 1946     8 Sheets-Sheet 1

INVENTOR.
ARCHIBALD H. DAVIS
BY Richey & Watts
ATTORNEYS

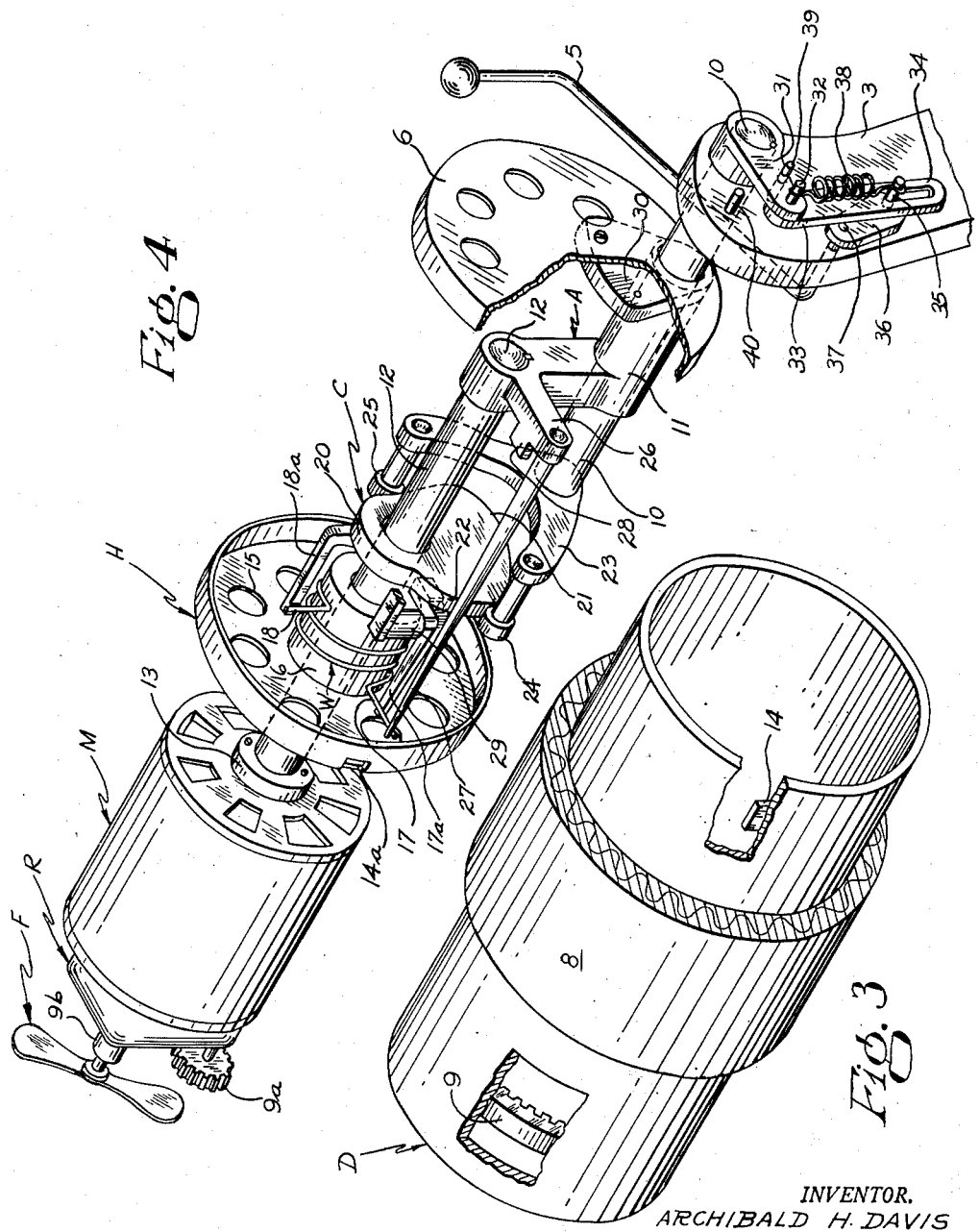

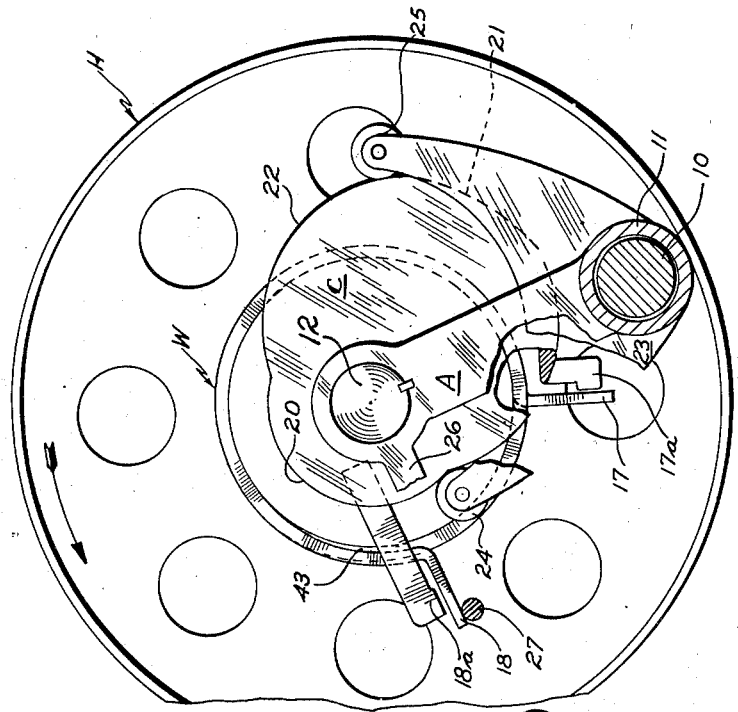
Fig. 9
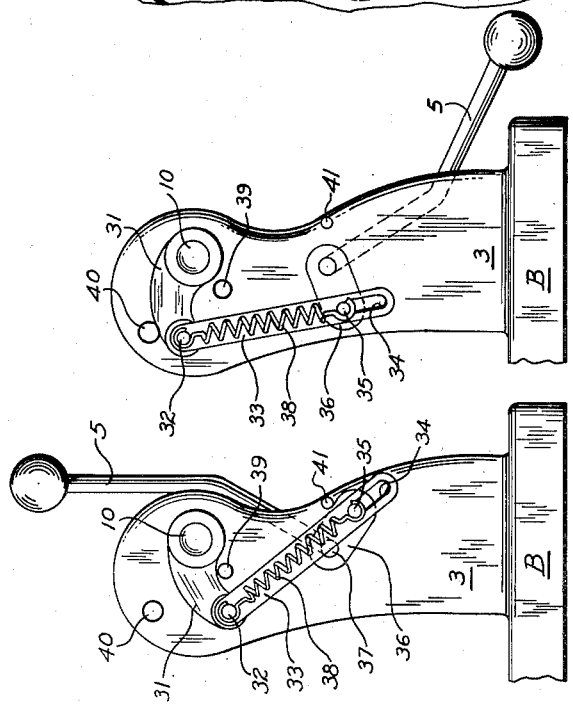
Fig. 6
Fig. 5
INVENTOR.
ARCHIBALD H. DAVIS
BY Richey & Watts
ATTORNEYS INVENTOR.
ARCHIBALD H. DAVIS
BY
Richey & Watts
ATTORNEYS

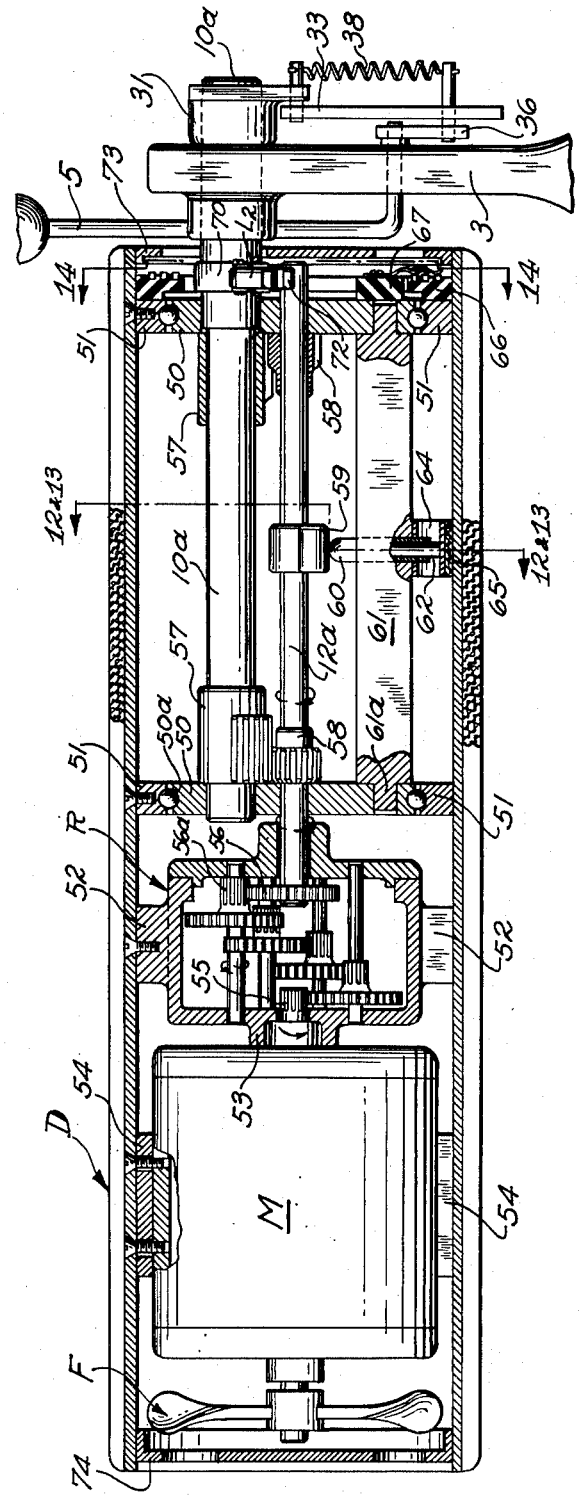

Jan. 29, 1952     A. H. DAVIS     2,583,685
REVERSIBLE MOTOR CONTROLLED PORTABLE IRONER
Filed Aug. 6, 1946     8 Sheets-Sheet 6

INVENTOR.
ARCHIBALD H. DAVIS
By Richey & Watts
ATTORNEYS

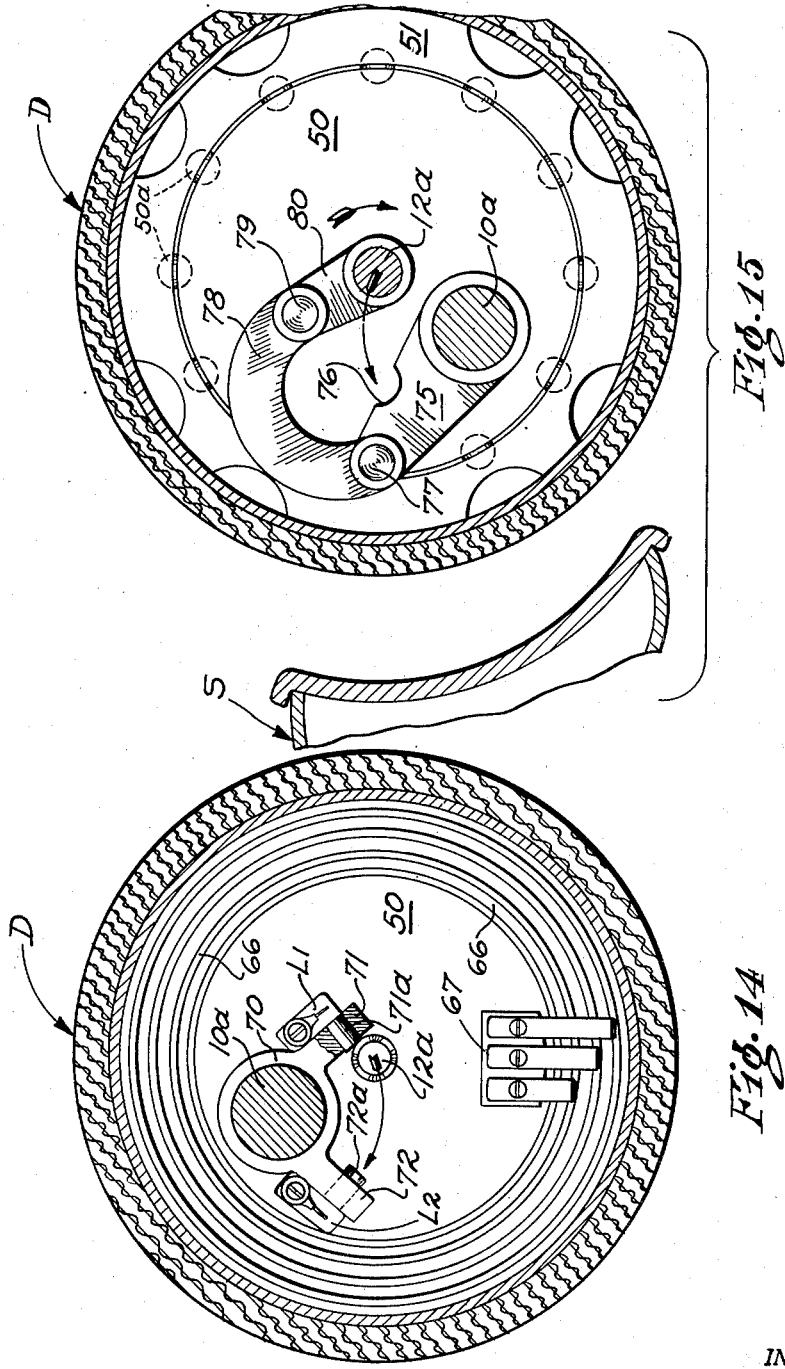

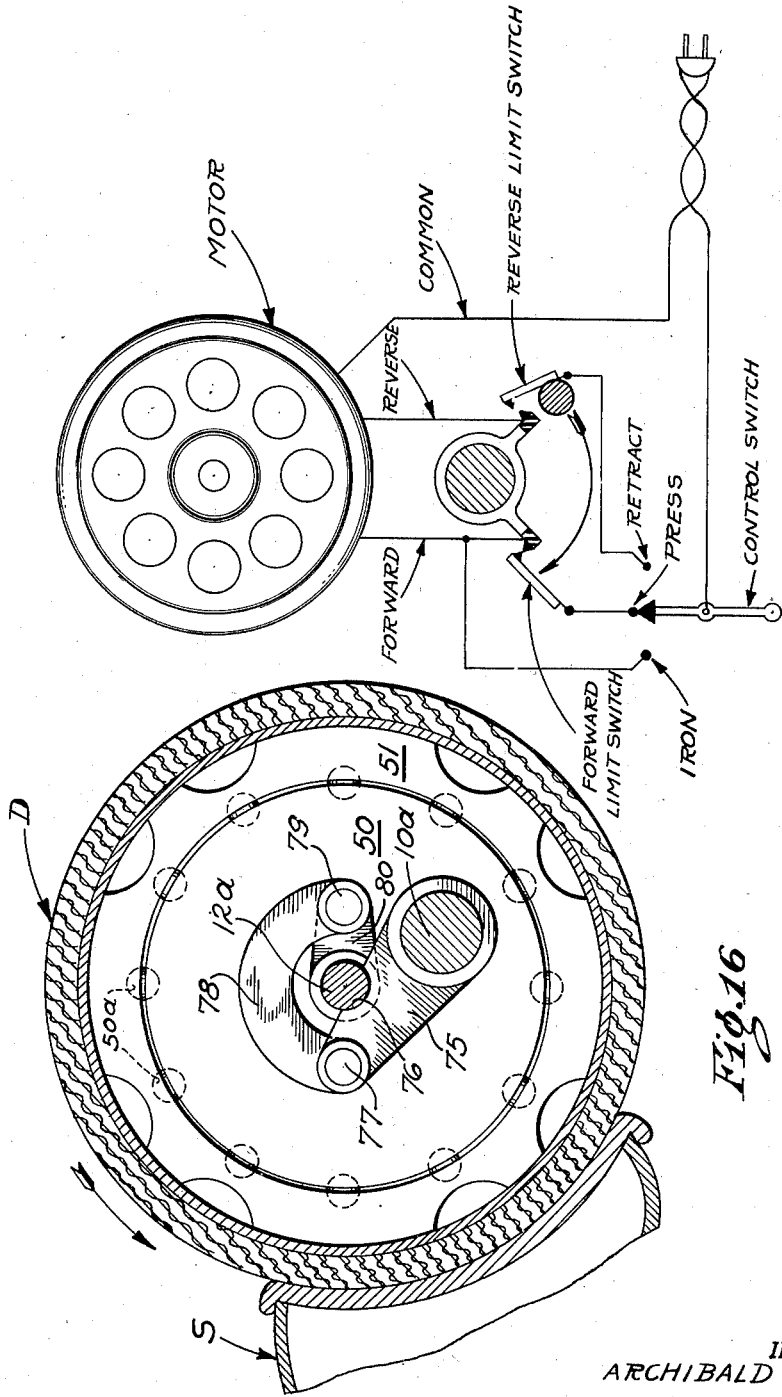

Patented Jan. 29, 1952

2,583,685

UNITED STATES PATENT OFFICE 2,583,685

REVERSIBLE MOTOR CONTROLLED PORTABLE IRONER

Archibald H. Davis, Sandusky, Ohio, assignor to The Apex Electrical Mfg. Co., Cleveland, Ohio, a corporation of Ohio Application August 6, 1946, Serial No. 688,663

11 Claims. (Cl. 38—59)

This invention relates to an electric ironer wherein the ironing drum and shoe are automatically moved together for ironing, a preferred specific embodiment being one which has a fixed ironing shoe and a rotatable drum member which automatically moves into position to press the fabric against the shoe and rotates to effect the ironing.

It is an object of this invention to provide a compact and simple mechanism for rotating the drum and positioning it with respect to the shoe, all of which mechanism is housed within the drum itself, thereby reducing the number of exterior obstructions and interferences which might trouble the operator.

In portable ironers which must be adapted for use on a standard height table, any increase in base height due to the placement of mechanism therein either results in an increase in height of the ironing drum and shoe or a decrease in clearance between those parts and the base, both conditions being undesirable. By placing all mechanism in the drum and none in the base, I am able to keep base thickness to a minimum.

One of the critical operations in using ironing machines is that of placing the fabric to be ironed on the drum or shoe in the proper position and insuring that it is properly positioned when the roll forces the fabric against the ironing shoe. This is best done if the operator can use both hands to position and guide the fabric, so it is highly desirable that the ironer be automatic in the sense that the rotation of the drum and positioning of the drum against the shoe can be initiated and controlled without requiring use of the operator's hands and without requiring any manually controlled clutches or complex series of distracting control operations on the part of the operator. Accordingly, it is another object of this invention to provide an automatic ironing mechanism in which the motor is started, the drum is positioned against the shoe and is also started turning by merely pressing a foot, knee or other electric motor control switch in one direction.

It is another object to so design the mechanism that the operator need do nothing more than manipulate the same control switch in order to reverse the motor which automatically causes the drum to return to its normal position and stop rotating, ready to receive the next piece of goods.

I accomplish these objects without resort to any manually controlled mechanical clutches and without need of controls to be manipulated by the operator except a single electric motor control switch.

A further object of my invention is to provide simple means to manually retract the drum from the shoe at any time regardless of the position of the drum before retraction is initiated. This is accomplished by a very simple spring and link mechanism which operates a stop mechanism within the drum itself, as will be described in detail presently.

Another object of my invention is to provide a simple spring pressure release mechanism to permit the drum to be forced back against spring pressure that is a function of the thickness of the ironed fabric, which spring relief mechanism may be a part of the drum positioning mechanism referred to above.

A further object lies in the provision of means whereby the operator can stop roll rotation at any time and maintain pressure contact of the roll against the shoe for a pressing operation.

Still another object of my invention is to provide an effective cooling for the motor to dissipate heat imparted to it by the shoe and drum. Briefly, this is accomplished by extending the motor shaft and attaching a fan blade to the shaft extension, and providing passageways for cooling air in any obstructing parts of the mechanism.

Reference is made to co-pending application Serial No. 688,662, which has matured into Patent No. 2,538,617 of January 16, 1951, filed by Archibald H. Davis, Thomas Harris, and Edward C. Swilik, August 6, 1946, and assigned to The Apex Electrical Mfg. Company, Cleveland, Ohio, which co-pending application claims the structure described and illustrated wherein a clutch is employed in connection with a reversible motor as the control medium for an ironer.

These and other objects will be apparent as the following detailed description of my invention proceeds.

In the drawings:

Fig. 3 is a view of part of the drum member in one form of the invention with parts broken away to show the driving gear and driving key;

Fig. 4 is a perspective schematic representation of the basic mechanism employed in one form to produce the objects of my invention previously described. In this figure the parts are shown schematically for purposes of illustration and many of the parts are somewhat elongated to avoid visual interference of the parts;

Figs. 5 and 6 illustrate the manual drum position linkage and spring relief mechanism, Fig. 5 showing it in normal position and Fig. 6 in a retracted position;

Figures 1, 10:
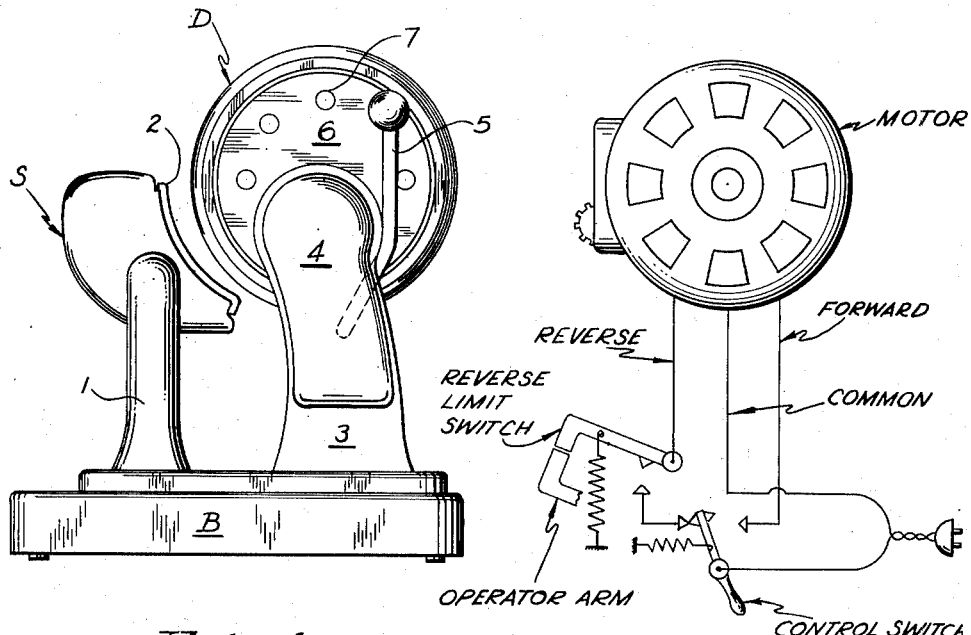
Figs. 1 and 2 are external views of my ironer showing that it is entirely free from external mechanism.
Figure 8:
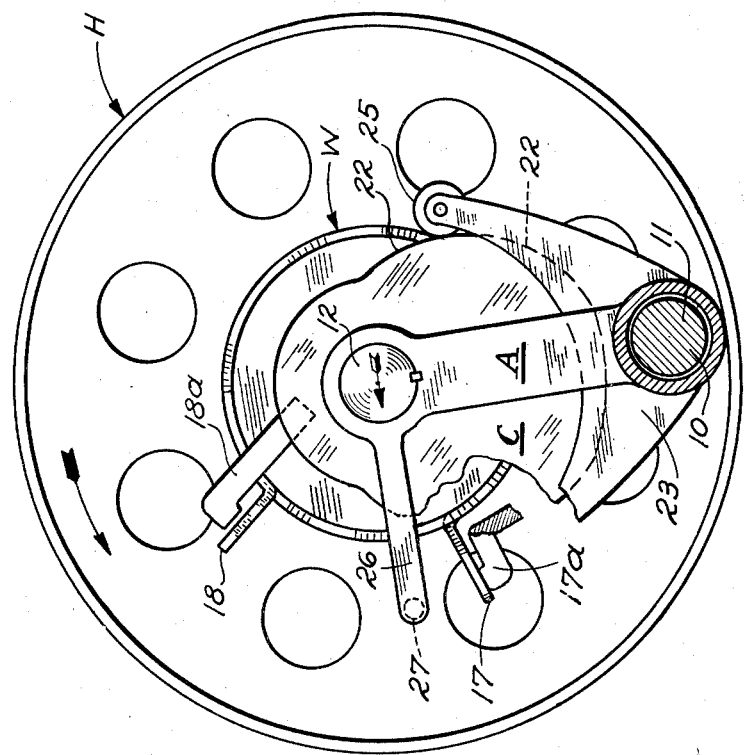
Figure 7:
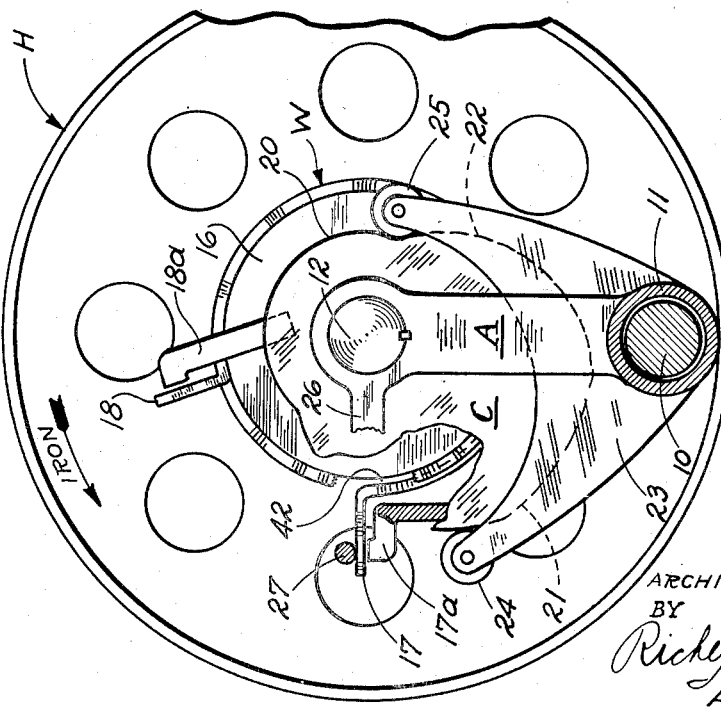
Figure 13:
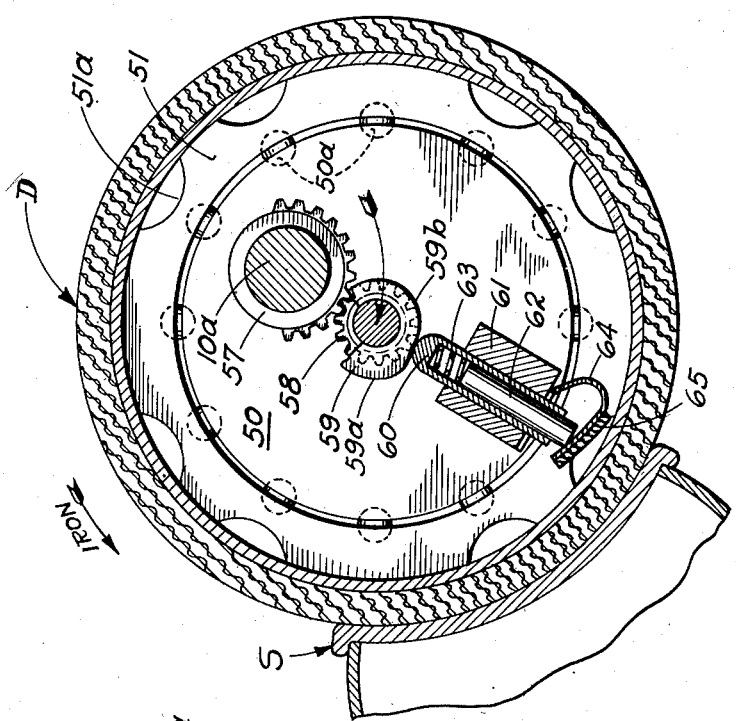
Figure 12:
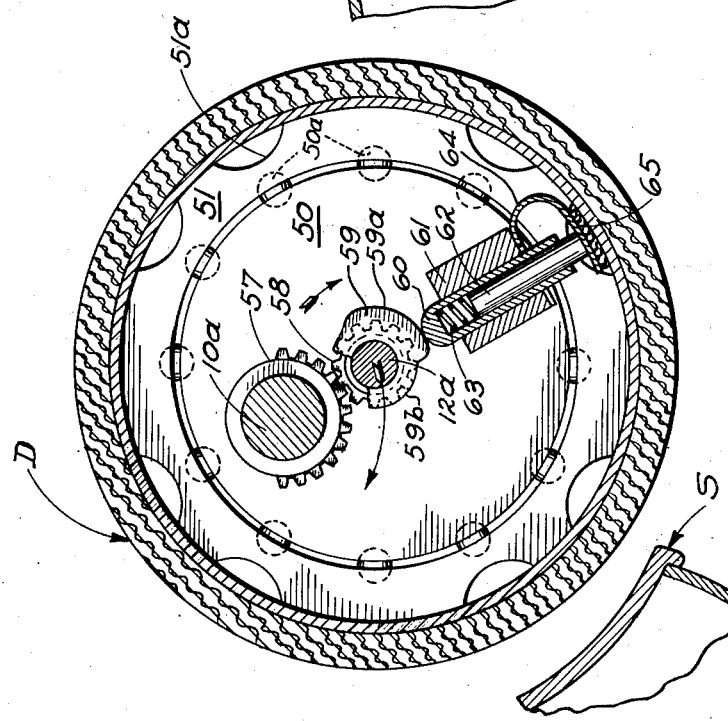

Figs. 7 to 9 are end elevations of the portion of the mechanism in the same form which causes the novel automatic action and positioning of the drum. Fig. 7 shows the parts in their normal retracted position, the position being that which would occur just before the control switch is pressed to start the ironer. Fig. 8 shows an intermediate position of the drum as it moves toward the shoe. Fig. 9 shows the drum in its forward position ready for ironing;

Fig. 10 is a schematic diagram to illustrate the principles of how the control switch and the automatic stop switch may be connected to the motor in the same form. This figure is not intended to show actual electric wiring, it merely illustrates the function which is produced, the actual wiring being determined by the type of motor and the available current supply;

Fig. 11 is a longitudinal section through a modified form of my invention;

Fig. 12 is a cross section through the ironer taken on line 12—12 of Fig. 11 showing the mechanism in its retracted position;

Fig. 13 is the same section showing it in its ironing position;

Fig. 14 is a section taken at 14—14 of Fig. 11, showing the collector rings and limit stop assembly;

Figs. 15 and 16 show a modified form of drum positioning mechanism, Fig. 15 showing the retracted position and Fig. 16 the ironing position; and Fig. 17 is an elementary circuit diagram which may be used in the two modified forms of ironer.

Figure 2:
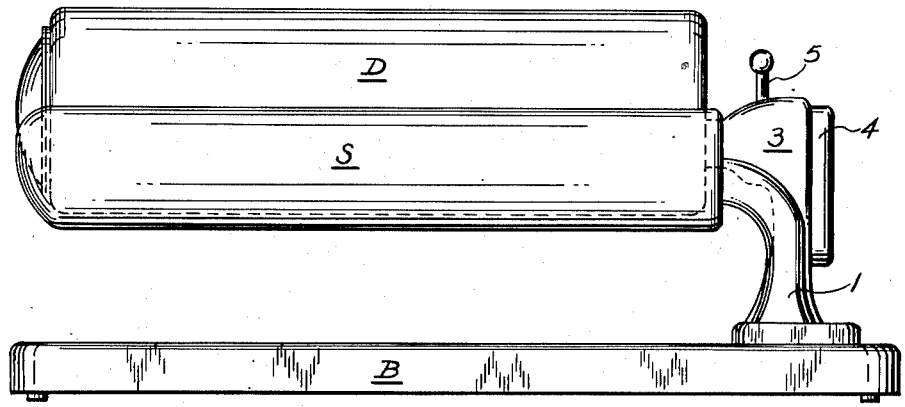

In Figs. 1 and 2 can be seen the base structure B, the support arm 1 which carries the heated shoe S, and the metal ironing plate 2. A bracket 3 is fixed to the base B and is in effect part of the base or frame structure. Bracket 3 forms part of the structure that supports the drum D. The cover plate 4 covers the manual positioning and release mechanism which will be described in detail later. Suffice to say at this time that the pressure release lever 5 enables the operator to retract the drum manually at any time. The end plate of the drum 6 is apertured as at 7 to permit air circulation by a fan mounted in the drum.

In Fig. 3 part of the drum D is shown; it carries a fabric cover 8, a fragmentary portion of which is illustrated. There is also an internal ring gear 9 which is driven by a pinion 9a shown in Fig. 4. A part of the drum is also broken away in Fig. 3 to show a key 14 which drives a hub member H in the operating mechanism as will be described presently.

Referring to Fig. 4, the structure that supports the drum includes the bracket 3 fixed to the base which bracket supports in cantilever fashion an elongated member 10. Member 10 is normally fixed relative to bracket 3 but it is rotatable in the bracket for overload release. A movable drum support member is provided for mounting the drum on the normally fixed drum support means for motion toward and away from the shoe. The movable drum mounting means includes an arm A integral with a sleeve 11 rotatable on the normally fixed drum support means 10. Keyed to the arm A and offset from sleeve 11 is an elongated member or bar 12 forming a support for the motor M and also representing the center of rotation of the drum. The frame or housing of motor M is mounted on bar 12 by any convenient means indicated generally at 13 and the motor is also provided with a gear reduction R so that the pinion 9a may be driven at the required relatively slow speed.

The motor M may be series wound to automatically accommodate the ironing speed to the load at hand, this being a desirable feature. Since, as will appear in the following detailed description, the motor must be reversed to accomplish certain objects of this invention, use of a series motor has another advantage in that such motors are readily reversed without need for split phase fielding windings, capacitors and the like commonly found in squirrel-cage induction motors. I contemplate that my device could be fitted with a shunt or a squirrel-cage motor of any type but use of a series motor has the advantages herein mentioned.

The fan F is mounted upon a shaft member which is mechanically an extension of the motor shaft and which may rotate at motor speed. Forward of the motor a hub driving member H is mounted for independent rotation upon the supporting bar 12. Member H is driven by the key 14 on the drum, which key engages a recess or slot 14a in the periphery of the hub member H. Member H is apertured as at 15 for air circulation and is connected to and drives the hub 16 of an automatic partial revolution clutch which plays an important part in the operation of the device as will be described presently. The far end of the drum D is provided with a centrally apertured closure flange which is supported for rotation on bearing 9b. This flange will also have cooling apertures to permit circulation of air by the fan.

A helical clutch wire W is wrapped around the hub 16 so that it has a frictional engagement with the hub. The ends of the wire W may be bent outwardly as at 17 and 18 and the wire W is preferably made of spring steel of high tensile strength. The cam member C forms the third part of the clutch arrangement, the general action being that the spring wire W clutches together hub member H and the cam C. Cam C has a pair of arms 17a and 18a attached thereto or integral therewith for coaction with the extension arms 17 and 18 of the clutch spring W.

Cam C is formed with circular portions 20 and 21 the centers of which coincide with the center of the shaft or bar 12. The cam is also formed with lift edges 22 joining the two edges 20 and 21. The edges 22 are substantially circular having a common center below that of arm 12. A cam follower arm member 23 is mounted to turn with the support shaft 10 and has cam follower rollers 24 and 25. Shaft 10 is essentially stationary except for a slight motion that occurs as the roll applies pressure against the shoe. As will be explained presently, it is the action of cam C against the cam rollers 24 and 25 which causes the arm A and hence the drum to move to and from the shoe by pivoting about support shaft 10. Likewise, these same members interact to form stop means at each extreme of the drum's motion.

In order that the clutch W may be disengaged at proper times in the cycle, the arm A carries an extension 26 which mounts a clutch release pin 27, the pin being positioned in the path of motion of one or the other of the spring arms 17 or 18, depending upon the direction of rotation of the hub member H. Bracket 28 is also attached to the arm A for mounting a reverse normally closed limit switch 29 where it will be engaged by a member carried by the cam C. The majority of the supporting bracket 28 has been broken away so that the parts behind it may be clearly seen. A flange plate 30 or the like may be provided attached to the sleeve 11 in order to mount an end closure plate 6 which plate fits within the drum and is apertured for circulation of air.

At the right of Fig. 4 can be seen a simplified view of the manual positioning means and the spring relief mechanism. The supporting shaft 10 supports the entire drum mechanism upon pedestal 3 and shaft 10 carries the crank 31 which is pivoted by pin 32 to a link 33. The lower end of the link 33 may be slotted as at 34 and the slot receives the pin 35 mounted on the manually positionable crank 36. The crank 36 is pivoted in the support member 3 as at 37 and is controlled by the hand lever 5. The spring 38 is anchored by pins 32 and 35, the purpose of this spring being to provide a yielding pressure of the roll against the shoe during the ironing operation.

The mechanism just described appears in Figs. 5 and 6 in two positions. For the moment, assume that the position of the shaft 10 determines the position of the drum with respect to the shoe. This is actually the case when the drum is in either of its extreme positions as will be explained presently. In Fig. 5 the control lever 5 has been pulled back so that its pivot pin 35 is just to the right of a line connecting the pivot pin 32 on the crank 31, and the pivot 37 for the control crank arm 36. Thus, spring tension tends to rotate crank arm 36 counterclockwise but this may be prevented by a stop 41 acting against the crank 36 or by having the control lever 5 engage some fixed part of the support mechanism. In addition, tension of the spring 38 tends to bring the crank arm 31 down and move the drum toward the shoe but this is prevented by stop pin 39. The mechanism is arranged so that as the roll engages the shoe shaft 10 is turned clockwise a slight amount which lifts link 33 and stretches the spring 38. Slot 34 permits link 33 to slide along pin 35.

In Fig. 6 the control lever 5 has been positioned rearwardly and the control crank 36 passes to the other side of the imaginary line referred to between the two pivot pins. Link 33 thereby lifts the crank arm 31 and rotates the shaft 10, which withdraws the drum from the shoe. A stop 40 may be provided for the retracted position or an engagement between the control lever 5 and a fixed part may serve the same function.

The operation of the device will be described in connection with Figs. 7, 8 and 9, which clearly illustrate the action of the clutch mechanism and of the positioning mechanism controlled by shaft 10 previously referred to. In principle, in the form illustrated the roll is advanced toward and retracted from the shoe by positioning means that include driving means H driven by the motor and cam means C that reacts between means normally fixed relative to the base and means moving with the roll, as will now be described in detail. If the following description of Figs. 7 to 9 is read in conjunction with the schematic diagram shown in Fig. 4, a clear understanding of the detailed operation of the clutch mechanism and an overall orientation of how the parts are positioned with respect to one another will be had. Starting with Fig. 7, an elevation view of the member H, the cam, the wire clutch W and the cam follower arm and drum support arm A is shown. The mechanism shown in Fig. 7 is drawn in the position that it would assume if the operator had released the control switch referred to previously, and the drum had automatically withdrawn and had stopped rotating. As indicated by the arrow, the direction in which the drum rotates in order to iron is assumed to be counterclockwise. Now, as the control switch is moved to close the forward circuit, as seen in the wiring diagram in Fig. 10, the motor should start rotating in its forward direction and due to the gearing and drive to the hub member shown previously, that member will start to rotate in the direction of the arrow. Since the spring clutch wire W has a frictional engagement with the hub 16, rotation of the member H carries the spring W with it, and the arm 18 on the spring member W tends to be carried away from the arm 18a on the cam C. The arm 17, which had formerly been pressed against the release pin 27 so that the wire was slightly spaced from the hub 16 as at 42, will now be turned away from the release pin. As the hub member 16 carries the wire W and the arm 17 away from the pin 27, the end of the wire adjacent arm 17 is permitted to spring back against the hub and remove the clearance shown at 42. When this occurs the parts are so related that the arm 17 is carried against the cam arm 17a. With the partial revolution clutch arrangement of the sort shown here, this immediately causes the wire W to be wrapped around and firmly clamped to the hub 16 and the wire W now tends to move with the hub 16 and hence with the member H. Since the arm 17 of the wire W is now locked to the hub member H, it will carry the arm 17a and hence the cam C along with it. The cam C is mounted for independent rotation on the supporting shaft 12 and it will be noted that a lift portion 22 of the cam will be moved under the roller 25 which roller is fixed to the stationary support shaft 10.

Since the shaft 10 is held stationary by the manual positioning and spring release means shown in Figs. 4, 5 and 6, the roller support arm 23 does not normally turn. However, it will be noted that arm A is free to turn on shaft 10 as can be seen in Figs. 4 and 7. Therefore, as the cam C is rotated by the clutch, the lift portion 22 reacts against the roller 25 and forces the entire drum supporting mechanism to the left in the figure so that arm A pivots upon shaft 10.

As seen in Figs. 7 and 9, the centers of cam surfaces 22 lie in a circle with a center mid-way between rollers 24 and 25. At intermediate positions the center drops below the line connecting the rollers so that there is a slight clearance at the non-reacting roller.

The forward cycle is shown partially completed in Fig. 8. It will be noted that the arm A has been forced towards the shoe, and that the lift portion 22 of the cam is continuing to react against the fixed roller 25. The other roller 24 of the cam (broken away for clarity) is adjacent a surface concentric with that engaged by the roller 25 so that as the arm A is moved to the left to increase the distance of the roller 25 from the center of the shaft 12, the surface engaged by roller 24 becomes a corresponding distance closer to the center of the shaft 12. It will be noted in Fig. 8 that the arm 17 is driving the cam arm 17a and that all clearance is taken up between the clutch wire and the hub and, as can be clearly seen in Fig. 4, this action tends to wrap the wire around the hub and to increase the driving action of the clutch.

In Fig. 9, the forward cycle is completed. The action just shown in Fig. 8 is continued until the arm 18 of the wire W is carried against the release pin 27 which, as can be seen in Fig. 4, is mounted on the arm A. When this happens the adjacent end of the wire W is lifted from the hub 16 and the force of the pin 27 against the spring arm 18 tends to unwrap wire from the hub 16 providing a clearance as at 43. Thus, the wire W no longer tends to be driven by the hub, and arm 17 of the wire will no longer tend to rotate the cam C by means of cam arm 17a.

Another action occurs at this point in that the roller 24 engages the surface 20 of the cam, which surface is substantially a segment of a circle having its center corresponding to the center of the shaft 12. With this, the center of shaft 12 cannot move any closer to the fixed roller 24 so that the arm A cannot pivot to the left any further, and motion of the drum towards the ironing shoe is stopped. It will be remembered that the rollers 24 and 25 are maintained in a fixed position by the shaft 10 during normal operation of the device. Roller 25 may now ride upon a circular portion 21 of the cam, which surface also has for its center the center of shaft 12. Thus, it would be possible to continue rotation of the cam C without changing the position of the drum relative to the base structure because both rollers are merely engaging circular cam edges with centers corresponding to that of cam rotation. Furthermore, if the cam C were rotated so that both rollers were on the circular portions 20 and 21 of the cam, any attempt to pivot the arm A in either direction about shaft 10 would be resisted by the rollers 24 and 25.

It will also be noted that the surface 22 of the cam which engages roller 25, exerts a powerful wedging action near the end of the cycle tending to urge the arm A towards the left. Since the lift of the cam is relatively small towards the end of the cycle, a given amount of torque tending to rotate the cam results in a high pressure or wedging of the ironing drum against the shoe. Even if the cam is designed so that the roller 25 never quite rides on the circular portion 21, any pressure against the drum and arm A tending to move it back would, due to reaction against the roller, tend to rotate the cam to the right. However, since the lift of the cam is small near the end of the cycle, it is possible that the friction forces resulting from such pressure would prevent any resultant action tending to rotate the cam, and even if such reaction were present, it would be very slight and would merely turn the cam clockwise causing cam arm 17a to engage wire arm 17 and move the wire W clockwise. Wire arm 18 is then carried away from release pin 27 causing the spring W to again wrap around the hub, re-engage the clutch, and restore the cam to its previous position. It will also be noted that when the drum assumes the position shown in Fig. 9, since the clutch is released, the drum can continue to rotate without encountering any resistance from the clutch and drum positioning mechanism.

When the operator desires to have the drum withdrawn from the shoe, he merely releases the control switch which, as shown in the diagram of Fig. 10, reverses the motor. When the motor reverses the arm 18 of the spring W is carried away from the release pin 27 and towards the cam arm 18a, and when the arm 18 engages the cam arm 18a, the spring is again wrapped around the hub 16 and further reverse rotation of the motor, hub and spring drives the cam C in a clockwise direction. Now, the portion of the cam 22 which engages roller 24 acts as a lift portion of the cam and since the roller 24 is stationary, the shaft 12 and the entire assembly is moved back towards its original position. When the initial position is reached, the arm 17 is brought up against pin 27 which releases the clutch and stops further rotation of the cam as seen in Fig. 7. Now shaft 12 and arm A cannot move any closer to roller 25 because circular portion 20 of the cam engages roller 25 so that the roller remains at a fixed minimum distance from the arm A. Thus, the portion 20 of the cam acts as a stop for both directions of drum motion.

It will be noted in Fig. 4 that the normally closed limit switch 29 is positioned to be engaged by cam arm 17a when the mechanism assumes the relationship shown in Fig. 7. Limit switch 29 does not appear in Fig. 7 in the interests of clarity but it is shown in Fig. 4 and it is so arranged that when the arm 17a reaches the position shown in Fig. 7 (and also in Fig. 4) the limit switch is opened. This opens the reverse circuit of the motor and the motor and hence drum rotation thereupon stops. The principle of the circuit is illustrated in Fig. 10 wherein release of the control switch has caused it to close the reverse circuit for the motor and at the end of the cycle the operator arm 17a has engaged the reverse limit switch, to open the reverse circuit and stop the motor. All the operator needs to do to initiate the ironing cycle is to close the control switch so that the motor will start in the forward direction.

It can be seen that due to the contour of the cam C and the relationship of the arm 23 which carries rollers 24 and 25, that the extreme fore and aft positions of the drum are determined by the position of the arm 23. As has been previously described, arm 23 is mounted on shaft 10 which, in turn, is pivotally mounted in the support structure 3. Also, it has been seen that the control structure and spring release structure determine the position of the shaft 10 and hence determine the two extreme positions of the drum. It will also be noted that in the extreme retracted position, retractions due to manual crank motion and due to the automatic retract motion are additive, providing ample clearance space between drum and shoe for steaming or clearing off the ironing surface.

It has been shown how any backward pressure against the drum, i. e., pressure tending to force it away from the shoe, is transmitted from the cam C to the rollers 25 and hence to the shaft 10. The parts are arranged so that the roll engages the shoe before the clutch disengages. Final rotation of cam C cannot move the drum so it moves rollers 25 and hence shaft 10 which turns against the force of the spring 38. If the parts are adjusted so that during this final action cam C is turned until the rollers are on the circular portions 20 and 21, since these surfaces have their centers coinciding with that of shaft 12, there will be no reaction from this spring pressure tending to rotate the cam.

Although I prefer that the motor be mounted in the roll, I contemplate that it could be mounted elsewhere and appropriate gearing be provided to drive the roll.

If the operator desires to use the ironer for pressing he need only place the switch for forward motion until the drum moves against the shoe and then place the switch in its intermediate position which prevents drum rotation.

In the operation of that form of the invention shown in Fig. 4, the roll or drum is moved toward the ironing shoe, and is rotated while bearing against the shoe. The supporting arm 10, projecting laterally from the base bracket 3 provides reaction rollers 24 and 25 which bear against the cam C so that rotation of the motor in one direction rocks the shaft 12 and the roll supported thereby toward the ironing shoe. The movement of the roll into engagement with the shoe is accompanied by rotation of the roll through pinion 9a and ring gear 9 carried by the roll. Opposite directional rotation of the motor causes a movement of the cam C so as to move the roll away from the shoe and at the same time interrupt the roll rotation drive at 9—9a.

The devices illustrated in Figs. 11 to 17 represent an ironer which performs the objects of this invention in a somewhat different manner from the partial revolution clutch type device previously described.

Referring to Figs. 11 to 14 inclusive, in Fig. 11 it can be seen that the drum support arm 10a is pivotally mounted on the base structure 3 with the same manual control link and spring relief means previously described for the first modification. The drum support arm 10a may have mounted and pivoted thereon a pair of eccentrics 50 which may be fitted with anti-friction bearings 50a to support the ring members 51. These ring members are screwed or otherwise attached to the metallic portion of the drum D in any convenient manner and may be relieved as at 51a for cooling purposes. The structure just described supports the whole drum and the mechanism contained therein upon the base structure.

Also supported within the drum is the gear reduction housing R which may be screwed or otherwise fastened to the metal drum part by spider blocks 52 which are spaced to permit circulation of air, or may be mounted on the motor frame. The motor M may be mounted with its frame fixed to the drum by means of spaced spider blocks 54 which also permit air to be circulated by a fan blade F which is mounted on an extension of the motor shaft and which turns at motor speed. I also contemplate that the motor may be supported by the gear reduction housing, this being a mere matter of design. The locating flange 53 on the gear reduction housing centers the motor pinion 55 therewith, which pinion drives the first of the train of reduction gears. The last gear of the reduction train drives a gear 56 attached to the shaft 12a, which gear and shaft part form the center of drum rotation. It can be seen at this point that if shaft 12a is assumed to be held stationary, gear 56 in the gear reduction housing must also be stationary. With this, the turning motor pinion 55, acting through the train of gears in the gear box, turns gear 56a causing gear 56a to walk around fixed gear 56 at a reduced speed. This causes the gear reduction housing and hence the drum to rotate in the same direction at a reduced speed, the direction being selected for the given ironer arrangement to permit the ironing process to be carried out.

The remaining mechanism is that which is provided to automatically cause the ironer drum to move toward and press against the shoe before rotation of the drum begins. The positioning means for causing advance and retraction of the roll is in principle like that described in connection with the previously described embodiment. The positioning means includes driving means 56 for operation by the motor, and a shaft 12a and gearing that reacts between means normally fixed relative to the base and the roll, as will now be described in detail. One or more gear members 57 are fastened to the normally fixed drum support means 10a and these mesh with one or more pinions 58 keyed to the shaft 12a which shaft forms the center of rotation of the drum and forms part of the movable drum mounting means. Both shafts 10a and 12a are free to rotate in the eccentrics 50. Before the operation of the drum positioning structure is further described, a special brake structure which may be provided to insure positive operation will be mentioned. This brake structure includes a cam 59 fastened to the shaft 12a and, as can be seen in Figs. 11 to 13, a plunger 60 is mounted in a support 61 which support is non-rotatably supported as at 61a by eccentrics 50. A plunger 62 may be provided which is always in engagement with the brake support leaf spring 64, which leaf spring is normally retracted and carries the brake shoe 65 as best seen in Figs. 12 and 13.

The operation of the brake structure will be described in conjunction with that of the gear structure, after the stop and limit switch structure shown in Figs. 11 and 14 is explained. This structure, which may be mounted outside the outer eccentric 50, includes a limit stop support member 70 mounted on drum support arm 10a, integral with two stop arms 71 and 72. Normally close limit switches L₁ and L₂ may also be mounted on the stop arms and may include operating plungers 71a and 72a respectively. The structure is such that if limit switch L₁ has its plunger depressed by the drum shaft 12a, reverse rotation of the motor is cut out, and similarly, if the limit switch L₂ has its plunger 72a depressed by the shaft 12a, forward motion of the motor may be cut out providing the control circuit is set up for that action. The exact operation of the limit switches will be discussed in connection with the wiring diagram shown in Fig. 17 after the mechanical operation of the modification under consideration has been described. An insulating block and collector ring assembly 66 may be mounted in any convenient location along with a contact finger assembly 67 to conduct current to the motor. Apertured closure plates 73 and 74 may also be fitted to each end of the drum.

Assume now that the motor rotation and the gear box arrangement is such that when the electric control circuit is set up for forward operation that the motor tends to turn gear 56 and hence shaft 12a in the direction shown by the solid arrow in Figs. 11 and 12. It was formerly assumed that shaft 12a was fixed but when the drum is in its withdrawn position and the motor is started for forward operation such is not the case. As can be seen in Fig. 12, clockwise rotation of pinion 58 on shaft 12a against the fixed gear 57 mounted on the normally fixed drum support 10a tends to cause pinion 58 and hence shaft 12a to walk around gear 57 in a clockwise direction as shown by the arrow. This pivots the eccentrics 50 about the shaft 10a which, in turn, causes the entire drum to move towards the shoe S.

The drum itself cannot rotate on the eccentrics 50 because the brake mechanism is urged radially outwardly by the high cam surface 59a of cam 59 thereby frictionally locking the drum to the eccentrics 50. As the drum engages the ironing shoe, as shown in Fig. 13, frictional forces developed at the shoe tend to resist drum rotation and the brake is no longer needed. The cam is so designed that at this point its low portion 59b comes under the plunger 60 and the spring arm 64 withdraws the shoe 65 from the engagement with the drum. Spring 63 may be provided to act as a safety means in case of jamming and to compensate for brake wear. As the action continues and the drum is forced towards the shoe, frictional forces increase, which tend to prevent drum rotation and, due to the gear reduction between gears 57 and 58, a powerful pressure may be applied by the drum against the shoe before the drum will have a tendency to rotate. In other words, I prefer to design the machine so that the torque represented by the product of the force exerted by the drum positioning mechanism, the coefficient of friction between drum and shoe and the radius of the drum, is greater than the torque tending to rotate the drum. This means that until the drum positioning mechanism is positively stopped, pressure between drum and shoe will increase and the drum will not rotate.

In order that rotation of the drum may begin, a stop member 72 supported by and fixed to the normally fixed drum support 10a is so positioned that when the drum has exerted the required amount of force against the shoe thereby stretching spring 38, the movable drum support shaft 12a strikes the stop 72 which prevents it from moving any closer to the shoe. It will be remembered that shaft 10a is mounted on the spring relief manual locking means previously described so that the final pressure exerted depends upon the strength of the relief spring 38. When the pivoting of shaft 12a and the eccentrics about drum support 10a is stopped by the forward stop 72, the gear 57 thereafter holds gear 58 and hence holds shaft 12a from further rotation. This, in turn, holds gear 56 within the gear box in a fixed position and further rotation of the motor causes the final pinion 56a in the gear train to walk around fixed gear 56 on the shaft 12a in such a direction in the example illustrated that the drum is rotated in a counterclockwise direction in order to iron.

One form of circuit diagram that illustrates the principles of the electric control is shown schematically in Fig. 17. This diagram is not intended to show actual wiring because that would depend upon the type of motor and current supply available. In the diagram the mechanism is in a retracted position and the shaft 12a has opened reverse limit switch $L_1$. Thus, it can be seen that even if the control switch were placed in the "retract" or reverse position, no further rotation of the motor in reverse is possible. Now, if the control switch is placed at the extreme left, which is labeled the "iron" position, the forward motor circuit will be established and the drum will first move toward the shoe and will then start rotating as has just been described. Of course, if the control switch is now moved to the "retract" position the motor will reverse because limit switch $L_1$ is now closed and all the mechanical actions just described will also occur in the reverse direction. With the motor reversed, shaft 12a is free to turn and move away from the forward stop 72 and, since the friction against the drum tends to prevent drum rotation, the shaft 12a will walk around normally fixed shaft 10a in the opposite direction and will cause the drum to retract from the shoe. As the drum is brought away from the shoe, the high part of the brake cam 59a will engage the brake plunger and engage the brake, which takes the place of the shoe friction in the sense that it continues to prevent drum rotation and assures drum withdrawal. When the shaft 12a strikes the reverse limit switch $L_1$, reverse rotation of the motor is automatically stopped and the mechanism comes to rest in its retracted position. If it is desired to use the iron to press, i. e., engage the shoe without turning, the control switch may be moved to its center or "press" position so that the forward limit switch $L_2$ is inserted in the forward motor circuit. Now, as soon as the drum is positioned firmly against the shoe and shaft 12a opens switch $L_2$ the switch will stop forward rotation of the motor leaving the mechanism firmly pressed against the shoe for a pressing operation.

The action of gears 57 and 58 in bringing the drum against the shoe may also be attained by a toggle or link mechanism shown in Figs. 15 and 16. In one form of this mechanism the normally fixed drum support 10a is arranged in the eccentric below the movable drum center shaft 12a, when the drum is withdrawn from the shoe. The link mechanism shown in these figures otherwise merely replaces the gears 57 and 58 and it is understood that the brake mechanism and limit mechanism shown in the various figures may also be present in this modification.

When the motor is started in the forward direction with the shoe retracted as shown in Fig. 15, and with drum rotation prevented by the brake mechanism, shaft 12a tends to rotate in a clockwise direction as it did in the previous modification. Since drum support 10a is held in a fixed position by the manual control and spring relief mechanism, rotation of shaft 12 tends to rotate a crank 80. A crank 75 is fixed to drum support 10a and is therefore stationary. The arm is connected to a link 78 by means of pivot pin 77. Link 78, in turn, is pivoted as at 79 to the crank 80 fastened to the drum center shaft 12a. Clockwise rotation of the drum center shaft 12a by the motor reacts through the link and crank tending to turn crank 75 and drum support 10a. But member 10a is fixed so that the only motion which can occur is a pivoting of eccentric 50 about drum support 10a. This motion is indicated by the arrow. This motion of the drum toward the shoe continues until shaft 12a engages a notch 76 in the fixed crank 75 at which point the drum is firmly pressed against the shoe. It will be noted that near the end of this action the pivots 77 and 79 are substantially aligned with shaft 12a so that a powerful toggle or force multiplying action is attained, giving adequate pressure of the drum against the shoe by stretching relief spring 38. The notch 76 may act as the forward mechanical stop, or the crank 75 may entirely clear shaft 12a in its forward position and a forward stop such as that shown in Fig. 14 can be relied upon. The reverse stop will be provided in any case and the two limit switches may also be provided to procure the advantages described in connection with circuit diagram shown in Fig. 17.

The operation of the modified form of the invention shown in Figs. 11–15 is functionally like the form of Fig. 4, in that the roll or drum is moved toward and away from the shoe by a reaction between the power unit and a cantilever support extending within the roll from the base bracket 3. The said reaction in the modified form of Figs. 11-15 is provided by a rotation of the gear 58 which is on the roll axis with respect to gear 57 affixed to the cantilever 10a which cantilever is eccentric of the roll axis. The rotation of the roll results from restraining the armature of the motor against rotation as at 55, and rotating the field windings of the motor which are secured to the roll as at 54.

I contemplate that the brake mechanism previously described may be supplied to produce the same results. All that is needed is that the brake be applied when the drum is clear of the shoe and it is desirable that the brake be released during rotation of the drum. In fact, since the torque tending to move the drum towards the shoe is greater than that tending to produce rotation of the drum, it is possible that the brake would not be needed at all and that the frictional resistance in the eccentric bearings would be enough to cause the drum to move towards the shoe. Of course, once the drum engages the shoe, frictional force of the shoe against the drum takes over and insures the completion of the advancing motion of the drum.

Having completed the detailed description of various forms of my invention, I contemplate that certain modifications thereof may be made. I have illustrated my invention in a simple form so that the basic principles thereof may be clearly understood and have not attempted to illustrate complicating design details.

The location of the various parts illustrated in the drawings is merely a convenient one and can be varied without affecting the nature of the invention. The exact design of the collector rings and of the gear box could be made in accordance with conventional practice. Insofar as the gear box is concerned, it is only necessary in the type of ironer illustrated that the final pinion 56 be turned in a direction such that it will cause the drum to move toward the shoe as it walks around the fixed pinion 56. These are matters of design dependent upon the type of ironer and relative location of operator, shoe and drum.

Although I have shown the drum supported on eccentrics, it is obvious that it could be supported on any support that moves with the offset shaft 12, such changes being mere design details within the skill of an ordinary mechanic.

I have illustrated the device on an ironer of the type wherein the shoe is positioned between the operator and the roll but the mechanism is equally well adapted for use on an ironer wherein the shoe is positioned behind the drum. It can be seen that I have provided a mechanism which is unusually simple to control in that the operator need only press a switch to start the entire mechanism in operation for ironing and release the same switch to withdraw the drum from the shoe and cause the drum to stop rotating, there being no manual clutches or other controls for normal operation.

Also, since the motor and all mechanism are in the drum, there need be no gear box in association with the drum support pedestal. This reduces the obstruction at the supported end and also reduces the overall length of the ironer without sacrificing roll length. A reduction in overall ironer length is particularly helpful with a portable ironer in that it facilitates stowage in the standard width kitchen cabinet.

It will be noted that with the preferred embodiment most of the drum rotating torque is applied through the motor gear housing, a smaller torque being applied through the motor stator because of the gear reduction. The principle of operation is unaltered if the reduction gear housing is mounted on the motor stator or the motor stator on the reduction gear housing, all this being mere routine machine design. With these considerations in mind, I contemplate that the term "motor" as used in the claims may include the gear reduction unit, and the term "stator" of the motor may include a gear reduction housing associated therewith. I also contemplate that the term "motor" as used in the claims shall include the unit or units which produce the opposing torques referred to in the specification, whether or not the motor windings themselves are the elements which directly produce those torques on the drum and drum positioning mechanism.

Although I prefer that the motor be mounted in the roll, I contemplate that the modifications referred to above as well as modifications in design details which are common knowledge to all machine designers and others may be made without departing from the spirit of the invention as defined in the appended claims.

Having thus described the present invention so that others skilled in the art may be able to understand and practice the same, I state that what I desire to secure by Letters Patent is defined in what is claimed.

What I claim is:

1. In an ironer, a base structure and an ironing shoe fixed to said base structure, fixed drum support means mounted on said base structure, a movable drum support member mounted on said fixed drum support for motion toward and away from the shoe, an ironing drum rotatably supported by said movable drum support member, a reversible electric motor supported by means including said fixed drum support, forward and reverse current supply circuits for said motor, a constantly engaged drive connection between motor and drum that tends to rotate the drum whenever either control circuit is energized, and positioning means driven by said motor that react against means on said fixed drum support to move said movable drum support member and drum toward the ironing shoe whenever the forward motor circuit is energized with the drum not in its final forward position, energization of the reverse circuit causing reversal of the motor and mechanism driven by it to withdraw the drum from the shoe when the drum is forward, and limit switch means in said reverse circuit engaged by means moving with the drum support to automatically stop the motor when the roll has withdrawn to a predetermined point.

2. In an ironer, a base structure and an ironing shoe fixed to said base structure, a fixed drum support arm mounted on said base structure, an intermediate member mounted to swing about the axis of said fixed drum support arm and having a constantly engaged driving connection with said fixed drum support arm, an ironing drum supported to swing with said intermediate member, a reversible electric motor having a stator and rotor, one of said motor elements having a constantly engaged driving connection with said drum tending to rotate it, the other motor element having a constantly engaged driving connection with said intermediate member tending to swing it and the drum toward and away from the shoe, and forward and reverse electric circuits for said motor.

3. In an ironer, a base structure and an ironing shoe fixed to said base structure, a fixed drum support arm mounted on said base structure, a drum support member pivotally mounted on said drum support arm, an intermediate member rotatably mounted in said drum support member and having a constantly engaged driving connection with said fixed drum support arm, an ironing drum supported by said pivoted drum support member, a reversible electric motor having a stator and rotor, one of said motor elements having a constantly engaged driving connection with said drum tending to rotate it, the other motor element having a constantly engaged driving connection with said intermediate member tending to move the drum toward and away from the shoe, and forward and reverse electric circuits for said motor.

4. In an ironer, a base structure and an ironing shoe fixed to said base structure, fixed drum support means mounted on said base structure, a movable drum support member mounted on said fixed drum support for motion toward and away from the shoe, an intermediate member movably supported in said movable drum support member and having a constantly engaged driving connection with said means, an ironing drum rotatably supported by said movable drum support member, a reversible electric motor, forward and reverse current supply circuits for said motor, a constantly engaged drive connection between said motor and drum that reacts against said intermediate member and hence tends to rotate the drum whenever the motor is energized and the intermediate member is held, said reaction of the energized motor with the intermediate member also tending to move said movable drum support member and drum toward the ironing shoe when the drum is held from rotation.

5. In an ironer, a base structure and an ironing shoe fixed to said base structure, a fixed drum support arm mounted on said base structure, a drum support member pivotally mounted on said drum support arm, a drive means rotatably mounted on said drum support member, means on said fixed drum support arm engaging said drive means, an ironing drum supported by said pivoted drum support member for rotation about an axis concentric with said shaft and eccentric to the pivot axis of said drum support member, a reversible electric motor having stator and rotor elements, one element having a driving connection with the drum support member and the other element having a driving connection with said drum and said drive means tending to cause said drive means to rotate on its mounting and react against said means on said fixed drum support arm thereby tending to swing said drive means, drum support member, and drum about said fixed drum support arm and toward the ironing shoe, said action automatically taking place whenever the motor is started in a forward direction, and means to stop said swinging action mechanically at a predetermined point with the motor continuing to rotate the drum in order to iron.

6. In an ironer, a base structure and an ironing shoe fixed to said base structure, normally fixed drum support means mounted on said base structure, a shaft supported by said drum support means and mounted to swing about said means, driving means between said shaft and said drum support means, an ironing drum rotatably supported by said fixed drum support means concentric with said shaft, a reversible electric motor having stator and rotor elements, gear reduction means driven by one of said motor elements tending to rotate said shaft, rotation of said shaft reacting through said driving means against said drum support arm thereby tending to swing said shaft and drum about said drum support arm and toward the ironing shoe, the other of said motor elements having a constantly engaged driving connection with the drum, and stop means carried by said drum support arm and engaged by means moving with said shaft whereby said swinging action is stopped in one direction at a predetermined point and the first motor element and reduction gearing react against the now stationary shaft so that the other motor element rotates the drum in order to iron.

7. In an ironer, a base structure and an ironing shoe fixed to said base structure, a fixed drum support arm mounted on said base structure, a drum support member pivotally mounted on said fixed drum support arm, a shaft rotatably mounted in said drum support member and having a pinion geared to a gear fixed to said fixed drum support arm, an ironing drum supported by said pivoted drum support member for rotation about an axis concentric with said shaft and eccentric to said pivot, a reversible electric motor supported by means including said drum support member and fixed drum support arm, gear reduction means driven by said motor and connected with said shaft tending to rotate said shaft, tendency of said shaft to rotate reacting through said pinion and gear drive against said fixed drum support arm thereby tending to pivot said shaft, pivoted drum support member, and drum about said fixed drum support arm and toward the ironing shoe, said action automatically taking place whenever the motor is started in a forward direction, and stop means carried by said fixed drum support arm and engaged by means carried by said pivoted drum support member whereby said pivoting action is stopped at a predetermined point and the motor and gearing react against the now stationary shaft so that the drum rotates in order to iron.

8. In an ironer, a base structure and an ironing shoe fixed to said base structure, a fixed drum support arm mounted on said base structure, a drum support member pivotally mounted on said fixed drum support arm, a shaft rotatably mounted in said drum support member and having a crank arm linked to a crank fixed to said fixed drum support arm, an ironing drum supported by said pivoted drum support member for rotation about an axis concentric with said shaft and eccentric to said pivot, a reversible electric motor supported by means including said drum support member and fixed drum support arm, gear reduction means driven by said motor and connected with said shaft tending to rotate said shaft, tendency of said shaft and crank to rotate reacting through said linkage against the crank on said fixed drum support arm thereby tending to pivot said shaft, pivoted drum support member, and drum, about said fixed drum support arm and toward the ironing shoe, said action automatically taking place whenever the motor is started in a forward direction, and stop means carried by said fixed drum support arm and engaged by means carried by said pivoted drum support member whereby said pivoting action is stopped at a predetermined point and the motor and gearing react against the now stationary shaft so that the drum rotates in order to iron.

9. In an ironer, a base structure and an ironing shoe fixed to said base structure, fixed drum support means mounted on said base structure, a movable drum support member mounted on said fixed drum support, an ironing drum rotatably supported by said movable drum support member, a reversible electric motor supported by means including said fixed drum support, forward and reverse electric control circuits for said motor, means driven by said motor and reacting against means on said fixed drum support tending to move said movable drum support member and drum toward the ironing shoe whenever the motor is started in a forward direction by energizing the forward control circuit, the reverse control circuit having normally closed limit switch means in series therewith, a member carried by said movable drum support member to open said limit switch means when the drum is driven against the shoe whereupon the motor is stopped for a pressing operation, energization of the reverse control circuit reversing the motor and acting to reverse said movable drum support member and automatically withdraw the drum from the shoe.

10. In an ironer, a base structure and an ironing shoe fixed to said base structure, fixed drum support means mounted on said base structure, a movable drum support member mounted on said fixed drum support, an ironing drum rotatably supported by said movable drum support member, a reversible electric motor supported by means including said fixed drum support and having a constantly engaged driving connection for rotating the drum, forward and reverse electric control circuits for said motor, means driven by said motor and reacting against means on said fixed drum support tending to move said movable drum support member and drum toward the ironing shoe whenever the motor is started in a forward direction by energizing the forward control circuit, the reverse control circuit having normally closed limit switch means in series therewith, a member carried by said movable drum support member to open said limit switch means when the drum is driven against the shoe whereupon the motor is stopped for a pressing operation, energization of the reverse control circuit reversing the motor and acting to reverse said movable drum support member and automatically withdraw the drum from the shoe.

11. In an ironer, a base structure mounting a fixed shoe, drum support means pivotally supported by said base structure, a drum support member mounted on said drum support means for motion toward and away from said shoe, a drum rotatably mounted on said drum support member, a stop means carried by said pivoted drum support means for engagement with cooperating stop structure movable with said drum support member, the position of said stop means defining the normal extreme positions of said drum support member and drum relative to said ironing shoe, a crank arm for moving said stop means, a control crank pivoted to said base structure, a link connecting said crank arm and control crank, said link comprising a rigid spacing member to positively position said stop means against motion toward the shoe at any setting of the control crank but which link permits motion of said stop means away from the shoe, and a spring connected to said stop means crank and said control crank to urge said stop means toward the shoe and against said rigid spacing means, said control crank having two positions one on each side of a line through the connection point of the link to the stop means crank arm and the pivot point of the control crank on the base structure.

ARCHIBALD H. DAVIS.

REFERENCES CITED

The following references are of record in the file of this patent:

UNITED STATES PATENTS

| Number | Name | Date |
| --- | --- | --- |
| 1,509,661 | Potter et al. | Sept. 23, 1924 |
| 1,661,646 | Wilhelm | Mar. 6, 1928 |
| 1,682,419 | Richards | Aug. 28, 1928 |
| 1,889,032 | Lee | Nov. 29, 1932 |
| 1,925,869 | Emery | Sept. 5, 1933 |
| 1,973,052 | Emery | Sept. 11, 1934 |
| 1,992,368 | Geldhof | Feb. 26, 1935 |
| 1,994,910 | Emery | Mar. 19, 1935 |
| 2,349,014 | Sperlich | May 16, 1944 |